(12) United States Patent
Hale et al.

(10) Patent No.: US 10,161,204 B2
(45) Date of Patent: Dec. 25, 2018

(54) TREATMENT OF HEAVY OIL CUTTINGS FOR DISPOSAL

(71) Applicant: CANADIAN ENERGY SERVICES L.P., Calgary (CA)

(72) Inventors: Jonathan Robert Hale, Calgary (CA); Jason Gray, Okotoks (CA)

(73) Assignee: Canadian Energy Services L.P., Calgary (CA)

( * ) Notice: Subject to any disclaimer, the term of this patent is extended or adjusted under 35 U.S.C. 154(b) by 525 days.

(21) Appl. No.: 14/926,039

(22) Filed: Oct. 29, 2015

(65) Prior Publication Data

US 2016/0138349 A1 May 19, 2016

Related U.S. Application Data

(60) Provisional application No. 62/073,692, filed on Oct. 31, 2014.

(51) Int. Cl.
| | | |
|---|---|---|
| C02F 1/38 | (2006.01) | |
| B01D 21/26 | (2006.01) | |
| E21B 21/06 | (2006.01) | |

(52) U.S. Cl.
CPC .......... *E21B 21/066* (2013.01); *B01D 21/262* (2013.01); *C02F 1/385* (2013.01)

(58) Field of Classification Search
CPC ...... E21B 21/066; C02F 1/385; B01D 21/262
See application file for complete search history.

(56) References Cited

U.S. PATENT DOCUMENTS

| | | |
|---|---|---|
| 3,737,037 A | 6/1973 | Bone, III |
| 3,840,553 A * | 10/1974 | Neel et al. ............... C09K 8/36 507/130 |
| 3,980,558 A | 9/1976 | Thompson |
| 4,460,292 A | 7/1984 | Durham et al. |
| 4,606,283 A | 8/1986 | Desormeaux et al. |
| 5,725,771 A | 3/1998 | Aliphat et al. |
| 6,838,485 B1 | 1/2005 | Quintero |
| 7,059,805 B1 | 6/2006 | Addison, Sr. |
| 7,670,277 B2 | 3/2010 | Ross et al. |
| 8,109,456 B2 | 2/2012 | Christensen |
| 8,267,200 B2 | 9/2012 | Fout et al. |
| 2007/0221411 A1* | 9/2007 | Butler ................... E21B 21/066 175/66 |
| 2009/0238643 A1 | 9/2009 | Pomerleau et al. |
| 2010/0193244 A1* | 8/2010 | Hoskins ................. C09K 8/035 175/5 |
| 2013/0174759 A1 | 7/2013 | Winkelman |

FOREIGN PATENT DOCUMENTS

| | | |
|---|---|---|
| JP | 0356184 | 3/1991 |
| WO | 20070102743 | 9/2007 |
| WO | 2012149345 | 11/2012 |
| WO | 2012172332 | 12/2012 |

OTHER PUBLICATIONS

Curtis, "A Literature Review of Liquid Antistripping and Tests for Measuring Stripping", Strategic Highway Research Program, National Research Council, Jul. 1990, 24 pages.

* cited by examiner

*Primary Examiner* — James C Goloboy
(74) *Attorney, Agent, or Firm* — Borden Ladner Gervais LLP

(57) ABSTRACT

The present disclosure is directed to stabilized drill cuttings and a process to stabilize the drill cuttings recovered from drilling a well. The cuttings are mixed with an emulsifier and waxy binding agent and then passed through a centrifuge to separate the stabilized drill cuttings from liquid. The stabilized drill cuttings can then be disposed in a suitable landfill. The stabilized cuttings may also be processed to remove oil and/or bitumen from them, prior to disposal.

13 Claims, No Drawings

TREATMENT OF HEAVY OIL CUTTINGS FOR DISPOSAL

CROSS REFERENCE TO RELATED APPLICATIONS

This application claims the benefit of priority of U.S. Provisional Patent Application No. 62/073,692, filed Oct. 31, 2014, which is incorporated herein by reference in its entirety.

FIELD

This disclosure relates to the disposal of drill cuttings from drilling wellbores. In particular, it relates to the disposal of drill cuttings from drilling well bores in heavy oil and bitumen formations.

BACKGROUND

In the exploration for petroleum and recovery of hydrocarbons from underground reservoirs, wells are drilled using drilling fluids. The drilling fluids are usually a heavy fluid or slurry and act, among other purposes, as a lubricant for the drill-bit when boring, for the removal of heat and drill cuttings from the bottom of the well, for the chemical balance of the well, and for overcoming hydrostatic pressures in the well. Different drilling fluids can be used and are usually classified as oil based fluids, water based fluid or emulsions. Drilling fluids may also contain high specific density minerals such as barite and include entrained minerals such as heavy metals.

The drilling fluids are circulated from the surface, through the drill string to the drill bit and return to the surface. On their return to the surface, the drilling fluids will include cuttings comprising sand, clay, petroleum such as bitumen or heavy oil, and other chemicals. The drilling fluid and cuttings are processed through a series of shale shakers, desanders, desilters, centrifuges, and other known devices to remove the solids, so that the drilling fluid is separated from the cuttings for reuse of the fluid in the borehole. The cuttings are removed for disposal to a waste pit or landfill site.

Drill cuttings from drilling oil and gas wells generally are composed of sand, mudstone, petroleum such as bitumen and/or heavy oil, water, chemicals, and residual drilling fluid. Once separated from the drilling fluid, these cuttings are stabilized to transport them to a landfill site. The different drilling fluids and their components will contaminate the cuttings and therefore also create a number of environmental issues for disposal of the cuttings.

A number of methods have been developed to dispose of drilling cuttings.

One proposed method for preparing the cuttings for disposal is set out in WO2007/102743. It discloses mixing the drill cuttings with cement to form a set or hardened product for disposal. This product prevents leaching of components into the environment. Another process to treat liquid waste for disposal adds amorphous silica such as rice hull ash to the liquid waste to form a solid or semi-solid mass to stabilize the liquid and increase the ease of transport and containment of the liquid and its contaminants. A further process uses thermal treatments to dry drill cuttings so they can be handled more easily.

U.S. Pat. No. 6,838,485 adds an emulsifier to the cuttings mixture to transform the free hydrocarbons in the cuttings into an emulsion. The emulsion is then treated with an encapsulating material to encapsulate the emulsified hydrocarbons. The encapsulating material surrounds the emulsified hydrocarbon droplets and solidifies. A preferred encapsulating material is silicate solution. The mixture of drill cuttings and encapsulated hydrocarbons is then released into marine waters where it disperses.

U.S. Pat. No. 7,059,805 discloses a process where drilling cuttings are mixed with dehydrated limestone coke ash in the presence of water. The drilling fluid residue in the cuttings becomes entrapped into a non-leaching solid. Following treatment of the drill cuttings with the dehydrated limestone coke ash, the resulting product can be used as a road or work area base.

One common method for treating drill cuttings for disposal in landfill sites is to mix them with sawdust. However, it requires mix ratios of at least 50/50 by volume with sawdust. This process adds costs to the hydrocarbon recovery process including the costs for the sawdust and associated cost of transporting the sawdust to the well site, and the cost of disposal of the total waste which is more than double the total volume of waste by mixing the sawdust and cuttings.

A further issue with these processes to dispose of the cuttings is that the petroleum products, such as bitumen or heavy oil, in the cuttings is not recovered. This petroleum is being disposed with the cuttings and therefore is lost revenue as well as a contaminant.

There is therefore a need for a process which uses traditional equipment but is less expensive to transport and dispose of the cuttings, does not significantly increase the volume of the cuttings, and which may also remove/recover at least a portion of the bitumen and heavy oil from the cuttings prior to disposal.

SUMMARY

It is an object of the present disclosure to obviate or mitigate at least one disadvantage of previous disposal systems.

In a first aspect, the present disclosure provides a process for stabilizing drill cuttings. The process comprises the steps of providing a slurry comprising the drill cuttings to a tank having a mixing device in the tank; adding an emulsifier and waxy binding agent to the slurry in the tank; mixing the slurry with the mixing device; removing at least a portion of the slurry from the tank to a centrifuge; passing the slurry through the centrifuge to separate a liquid and stabilized solid cuttings; and disposing of the stabilized solid cuttings. It may be necessary to add further liquid, such as water, to the tank to obtain a slurry having sufficient liquid content for mixing. The additional liquid may be obtained from the separated liquid obtained from the centrifuge.

The drill cuttings may be obtained from drilling a well. The well may be a well drilled for the production of hydrocarbons and in particular for the production of bitumen and/or heavy oil.

In further aspect, the present disclosure provides stabilized drill cuttings. The drill cuttings are stabilized by the addition of an emulsifier and waxy binding agent.

In a further aspect, the petroleum products, such as bitumen and/or heavy oil, present in the cuttings may be removed and recovered from the cuttings. The heavy oil and/or bitumen can be removed using any known process and in one aspect, the petroleum products are recovered using a solvent wash process.

DETAILED DESCRIPTION

The present process is a process for treating drill cuttings for disposal. It uses an emulsifier and a waxy binding agent to combine with the drilling cuttings to stabilize them. Water or other liquid is also removed from the cuttings. The result is drill cuttings which are substantially solid, stabilized for transportation, and which have a reduced volume, as compared to drill cuttings disposed using the conventional method of adding sawdust to the drill cuttings.

The present process is described for use in disposal of cuttings from wells drilled in tar sands or other deposits of heavy oil and/or bitumen for recovery of such hydrocarbons. However, wells may be drilled for recovery of other hydrocarbons, other recovery processes and other purposes. This process can be used to stabilize drill cuttings obtained from the drilling of any wells.

In one aspect, the drilling fluid is a water-based drilling fluid.

When drilling fluid is circulated through a well and returned to the surface with drill cuttings, the drill cuttings are separated from the recovered drilling fluid using traditional solids processing equipment conventionally used to remove the drill cuttings from drilling fluid. This process includes for example, a tank (for example a Davlin tank) and centrifuge. In a conventional process to remove drill cuttings from recovered drilling fluid, the recovered drilling fluid is processed through a shaker to remove larger solids from it. These larger solids are called shaker cuttings. The shaker cuttings also include liquid and other contaminates from the drilling fluid and are often a slurry. The remaining liquid from the recovered drilling fluid is then processed through a centrifuge to remove smaller solids. These smaller solids tend to be drier than the shaker cuttings and may not require sawdust added to them prior to disposal. They therefore may not need to be stabilized using the process set out below. The separated drilling fluid can then be reused in the drilling process.

The shaker cuttings are a slurry mixture and include the larger cuttings solids. According to the present process, the shaker cuttings are placed in a tank. If needed, water or other liquid may be added to the shaker cuttings. The tank has a mixing device in it. The mixing device may be an auger but any known mixing device can be used. Emulsifier and a waxy binding agent are added to the slurry. The action of the mixing device will help break down solids and mix the emulsifier and waxy binding agent with the slurry.

All or a portion of the liquid from the tank is passed to a centrifuge. In one aspect, the liquid is passed from the tank through an outlet positioned above the mixing device. The liquid is processed in the centrifuge which separates it into stabilized cuttings and a recovered liquid. All or a portion of the recovered liquid can be recycled back to the tank, recycled with the drilling fluid, or disposed of separately. The stabilized cuttings obtained from the centrifuge can then be mixed with the dry cuttings separated initially from the drilling fluid in the centrifuge in the first steps of separation if the centrifuge cuttings are sufficiently dry.

The waxy binding agent and emulsifier are generally added together to the slurry in the tank. However this is not essential and they may be added separately, in any order.

The waxy binding agent is a lipophilic substance, a substance which tendency to mix with, dissolve in, or be wetted by oil. It may also be hydrophobic. In one aspect, it is a solid which is mixed with the cuttings slurry prior to processing the slurry through the centrifuge to remove the solids. The waxy binding agent is preferably one or more stearamides or stearates such as metallic stearates, stearic acids or other such compounds with slightly shorter or longer alkyl groups. In one aspect of the process, the stearates are aluminum stearate, calcium stearate, and magnesium stearate. In a further aspect, the stearate is aluminum stearate. Other suitable waxy binding agents include microcrystalline waxes such as white Fury, oil soluble resin, and lignite.

The emulsifier can be any suitable emulsifier generally used with drill cuttings. In one aspect, the emulsifier is an imidazoline and preferably a TOFA/DETA (tall oil fatty acid/diethylene triamine) imidazoline. TOFA/DETA imidazoline are products made by reacting ethyleneamines and fatty acids. These substances are often used in the asphalt industry as "anti-strip" additives that improve adhesion of rock/aggregate and asphalt binder (bitumen). In one aspect, the TOFA/DETA imidazoline is the imidazoline formed by the reaction of tall oil fatty acids with diethylenetriamine, for example JC2090™ from Jacam Chemicals or Tarbreak Plus™ from Engenium Chemical Corporation. The emulsifier may be applied in a concentrated form or diluted with a solvent such as mineral oil. An appropriate concentration will be selected according to the specific emulsifier and cuttings/slurry make up.

Other "anti-strip" additives that may be useful as emulsifiers include cationic surface-active agents and in particular cationic amines including quaternary amines; anionic additives; and anionic-cationic additives. Preferably the anti-strip agents useful as emulsifiers in heavy oil cuttings are nitrogen containing compounds and may include, but are not limited to, amines; amides; diamines; quaternary ammonium compounds; nitrogen containing aromatic heterocyclic compounds including imidazolines, piperazines, and pyridines; polyamines including alkoxylated polyamines, and alkyl and alkylene polyamines; aminocarboxylic esters; amides-amines; fatty diamine/fatty acid salts; and norbornane amine derivatives. Examples of suitable anti-strip agents that may be used as emulsifiers are known in the art, for example in "A Literature Review of Liquid Antistripping and Tests for Measuring Stripping", Christine W. Curtis, Auburn University, Strategic Highway Research Program, National Research Council, Washington D.C., 1990 (SHRP-A/UIR-90-016).

Some examples of the chemical structures of the more common emulsifiers useful with drill cuttings include the following nitrogen containing structures:

Imidazoline

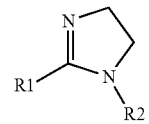

where R1 is a $C_{8-24}$ and R2 is $C_{8-24}$, H, or $CH_2CH_2OH$;

Amide

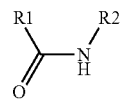

where R1 is $C_{8-24}$ and R2=

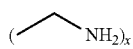

where x is 1-6 (polyamine);

Diamines

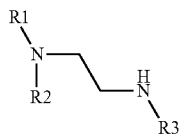

where R1 is $C_{8-24}$ and R2 is $CH_2CH_2OH$, or $C_{1-4}$; R3 is $(CH_2CH_2O)_xH$ where x is 1-5;

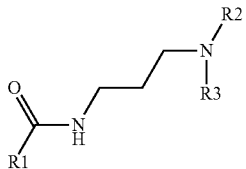

where R1 is $C_{8-24}$; R2 is $C_{1-4}$ or H; R2 is $C_{1-4}$ or H;

Primary Amines

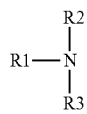

where R1 is $C_{8-24}$; R2 is $C_{1-4}$; R3 is $(CH_2CH_2O)_xH$ where x=1-5;

Piperazines

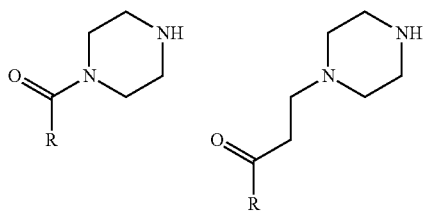

where R is $C_{8-24}$;

Quaternary Ammonium Compounds

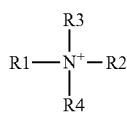

where R1 and R2 are independently $C_{8-24}$; R3 is $C_{1-24}$; R4 is $C_{1-4}$; and the charge is satisfied by $Cl^-$, $Br^-$, $SO_4^{2-}$, etc; and

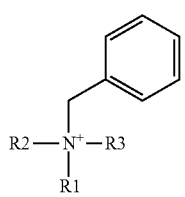

where R1 is $C_{8-24}$; R2 and R3 are independently $C_{1-4}$; and the charge is satisfied by $Cl^-$, $Br^-$, $SO_4^{2-}$, etc.; and Pyridine Quaternary Ammonium Compounds

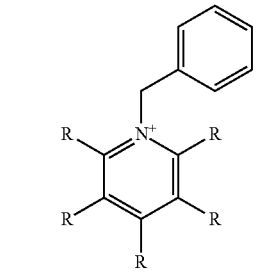

where R is $C_{1-4}$ or H; and the charge is satisfied by $Cl^-$, $Br^-$, $SO_4^{2-}$, etc.

After processing through the centrifuge, the dewatered cuttings with the added emulsifier and waxy binding agent become stabilized cuttings. The stabilized cuttings will be in a substantially solid form. The resulting stabilized cuttings can be transported to a landfill or other disposal site. The stabilized cuttings may also contain hardened bitumen and/or heavy oil which may be recovered to reduce contaminants at the disposal site as well as subsidize the operating costs for the disposal of the cuttings. The hardened bitumen and/or heavy oil may be soluble and may be recovered using any standard process such as a solvent wash process or thermal process.

The specific concentrations of the emulsifier and waxy binding agent will vary with a number of factors including the make up of the cuttings, amount of bitumen and heavy oil in the cuttings, and specific emulsifier and waxy binding agent selected. It has been found that 20 kg or less of waxy binding agent for 1 $m^3$ of hardened cuttings produced optimum results. This represents about 1% or less by weight of the waxy binding agent. In one aspect, about 0.5% by weight or less is used per 1 $m^3$ of cuttings. In a further aspect, about 0.1% by weight or less of the waxy binding agent is used. It has been found that 4 L or less of emulsifier per cubic meter of hardened cuttings produced optimum results. Similarly, this represents about 1% or less by weight emulsifier. In one aspect, 0.5% by weight or less of the emulsifier is used to treat 1 $m^3$ of cuttings. It has been noted that higher concentrations of the emulsifier and waxy binding agent can be used without a detrimental effect and concentrations of 5% or more are still suitable but less economical.

Since the stabilized cuttings do not have added sawdust or other bulky material, the resulting cuttings have less volume. For example, the stabilized cuttings obtained using the present process will have about 70% less volume than cuttings stabilized with sawdust. This reduces the volume of the cuttings being transported and deposited into a landfill or other disposal site.

The above process is described for use in disposal of cuttings from wells drilled in tar sands or other deposits of heavy oil and bitumen for recovery of such hydrocarbons. However, wells are drilled for other recovery processes and other purposes. This process can be used to stabilize cuttings from other wells.

EXAMPLES

The examples tested one or more of the following solids as the waxy binding agent for stabilizing drill cuttings:
Stearamide
Stearic acid Aluminum Stearate (200 F and 300 F)
Calcium Stearate
Magnesium Stearate
Potassium Stearate
polyethylene wax (white Fury)
OSR—oil soluble resin (AAA-106)
Lignite In the samples tested below, Ez-Gel is a commercially available viscosifier, and the samples included a commercially available defoaming agent. The emulsifier used in the examples is TOFA/DETA imidazoline, and the samples included either Tarbreak Plus or JC2090, both of which are commercially available.

Example 1

Lab treatment concentrations were equivalent to 1 kg of solid material per kg of bitumen core/bitumen cuttings and 0.25 L of emulsifier per kg of bitumen core/bitumen cuttings. Specific concentrations of the waxy binding agent and emulsifier will depend on the makeup of the cuttings including the amount of oil/bitumen on the cuttings to be treated.

Table 1 shows the results of testing two different emulsifiers, Tarbreak Plus and JC2090. Both are TOFA/DETA imidazolines. Calcium stearate and aluminum stearate were used as the waxy binding agent. In the method, samples of 100 g of Fort MacMurray core were rolled with Tarbreak Plus or JC2090 and Calcium Stearate or Aluminum Stearate. All samples were mixed for 30 minutes in a Hamilton Beach mixer. The rheology was tested on Fann35 at ambient temperature. For the anti-accretion testing, 350 ml of the polymer fluid was prepared. A steel bar was weighted out before rolling. 100 g of McMurray Core was added to each rolling cell. All samples were rolled for 16 hours at ambient temperature and the samples were reweighted. Observations were recorded for the steel bar, rolling cell, fluid and core. This initial testing showed that the Aluminum Stearate and Tarbreak Plus combination produced a slightly stiffer mass of solids and slightly cleaner cell than when JC 2090 was used.

The results show that both emulsifiers were effective. Calcium stearate and aluminum stearate were used as the waxy binding agent and both were effective. The resulting core was cohesive and moldable, with a clay consistency. The cuttings, mixed with these agents, appeared to be sufficiently stabilized.

Example 2

The same procedure as above was used with different types of solid waxy binding agents. This testing used Tarbreak Plus as the emulsifier. In Table 2A, the waxy binding agents were aluminum stearate, stearamide, and mixtures of lignite and a polyethylene waxy material, white fury. Two mixtures of lignite and white fury, at different concentrations, were tested. In Table 2B, the samples included Tarbreak Plus as the emulsifier and AAA-106 and white fury as the waxy binding agent. Table 2B also includes two comparative samples where no emulsifier and no emulsifier/waxy binding agent were included. All of the cuttings for the samples using emulsifier and waxy binding agent were sufficiently stabilized for disposal.

Example 3

For these samples, field cuttings from a shaker were used and hand mixed with one or more of an emulsifier and waxy binding agent. They were allowed to sit and the excess fluid was decanted. The hardening of the samples was recorded. The tested waxy binding agent included stearic acid, stearamide, aluminum stearate, magnesium stearate, potassium stearate and Jemstear. Different purities and grades of aluminum stearate were tested.

From the tested substances, it appears that all of the purities and grades of aluminum stearate, in conjunction with the emulsifier, worked most effectively to produce cuttings that are less tacky and stiffer. Also, the fluid appeared to contain less free oil when rolled in a cell. The stearamide, and magnesium stearate also worked effectively. Each of the stearic acid and calcium stearate, with the emulsifier, worked effectively. Various samples of these products were effective to produce stabilize drill cuttings using several different lab methods (hand mixing, and rolling in a cell with a steel bar) as well as in the field. The potassium stearate did not work as effectively as other stearates. The emulsifier without a waxy binding agent, and stearamide without an emulsifier, did not work well.

TABLE 1

Anti-Accretion: Assessment of JC 2090 (50% (v/v) active)

| Trial | Additive | Concentration | $\theta_{200}$ | $\theta_{200}$ | PV (mPa · s) | YP (Pa) | pH | Observations (steel bar) | Observations (cell) | Observations (fluid) | Observations (core) |
|---|---|---|---|---|---|---|---|---|---|---|---|
| 1 | E2-Gel<br>Tarbreak Plus<br>Defoamer<br>Aluminum Stearate<br>Sulphamic Acid | 3 kg/m²<br>25 L/m²<br>6 L/m³<br>100 kg/m³<br>0.26 kg/m² | 46 | 35 | 11 | 12 | 6 | Initially high residue (but very easily peeled off) | Cell clean | Fluid clean no oil separation on top (initially foamed) | Soft and moldable Moist Clay like consistency Cohesive |
| 2 | EZ-Gel<br>JC 2090<br>Aluminum Stearate<br>Defoamer<br>Sulphamic Acid | 3 kg/m²<br>25 L/m³<br>100 kg/m³<br>6 L/m³<br>2 kg/m² | 56 | 42.5 | 13 | 14.75 | 5 | Initially high residue (but very easily peeled off) | Some residue on cell walls, somewhat easy to peel off | Fluid clean no oil separation on top | Very moldable, clay like Moist |
| 3 | EZ-Gel<br>JC 2090<br>Calcium Stearate<br>Defoamer<br>Sulphamic Acid | 3 kg/m³<br>25 L/m³<br>100 kg/m³<br>6 L/m³<br>2 kg/m³ | 39 | 29 | 10 | 9.5 | 6 | Initially high residue (but somewhat easy peeled off) | Cell walls very clean | Fluid clean no oil separation on top | Very moldable, clay like Moist |

TABLE 2a

| Trial | Additive | Concentration | $\theta_{200}$ | $\theta_{200}$ | PV (mPa·s) | YP (Pa) | pH | Observations (steel bar) | Observations (cell) | Observations (fluid) | Observations (core) |
|---|---|---|---|---|---|---|---|---|---|---|---|
| 1 | Ez-Gel<br>Tarbreak Plus<br>Defoamer<br>Aluminum Stearate<br>Sulphamic Acid | 3 kg/m³<br>25 L/m³<br>6 L/m³<br>100 kg/m²<br>0.28 kg/m³ | 46 | 35 | 11 | 12 | 6 | Initially high residue (but very easily peeled off) | Cell clean | Fluid clean no oil separation on top (initially foamed) | Soft and moldable<br>Moist<br>Clay like consistency<br>Cohesive |
| 2 | Ez-Gel<br>Tarbreak Plus<br>white Fury: Lignite (60:40)<br>Defoamer<br>Sulphamic Acid | 3 kg/m³<br>25 L/m³<br>100 kg/m³<br>6 L/m³<br>1 kg/m³ | 40 | 28 | 12 | 8 | 5.9 | Initially high residue (but very easily peeled off) | Most of the cell clean, very small residue at the bottom | Fluid clean no oil separation on top | Firm but moldable<br>Somewhat moist<br>Slightly grainy |
| 3 | EZ/Gel<br>Tarbreak Plus<br>White Fury; Lignite (80:20)<br>Defoamer<br>Sulphamic Acid | 3 kg/m³<br>25 L/m²<br>100 kg/m²<br>6 L/m²<br>1 kg/m³ | 39 | 27 | 12 | 7.5 | 6 | Initially high residue (but somewhat easy peeled off) | Moderate residue throughout cell | Fluid clean no oil separation on top | Grainy (brakes easily when force applied)<br>Low moisture content |
| 3 | EZ-Gel<br>Tarbreak Plus<br>Stearamide<br>Defoamer<br>Sulphamic Acid | 3 kg/m³<br>25 L/m³<br>100 kg/m²<br>6 L/m²<br>1 kg/m² | 46.5 | 33 | 13.5 | 9.75 | 6.1 | Initially high residue (but easy peeled off) | Moderate residue throughout cell, very easy to peel off | Fluid clean no oil separation on top | Soft and moldable<br>Moist<br>Clay like consistency<br>Cohesive |

TABLE 2b

| Trial | Additive | Concentration | Initial Weight of Steel Bar | Final Weight of Steel Bar | Bitumen Accretion Factor (g/m2) | $\theta_{300}$ | $\theta_{300}$ | PV (mPa·s) | YP (Pa) | pH | Observations (steel bar) |
|---|---|---|---|---|---|---|---|---|---|---|---|
| 1 | EZ-Gel<br>Caustic Soda | 3 kg/m³<br>0.2 kg/m² | 401.48 | 401.55 | 7.8 | 27 | 19 | 8 | 5.5 | 9.3 | Low residue<br>Easy wipe/clean |
| 2 | EZ-Gel<br>Tarbreak Plus<br>Defoamer<br>Sulphamic Acid | 3 kg/m³<br>25 L/m³<br>2 L/m²<br>0.26 kg/m³ | 402.62 | 402.67 | 5.62 | 27 | 20 | 7 | 6.5 | 10 | Low residue<br>Easy to wipe/clean |
| 3 | EZ-Gel<br>Tarbreak Plus<br>AAA-106<br>Defoamer<br>Sulphamic Acid | 3 kg/m³<br>25 L/m³<br>100 kg/m³<br>2 L/m²<br>0.25 kg/m³ | 401.51 | 402.13 | 69.66 | 35 | 26 | 9 | 8.5 | 9.8 | Moderate residue<br>Somewhat easy to wipe/clean |
| 4 | EZ-Gel<br>Tarbreak Plus<br>White Fury<br>Defoamer<br>Sulphamic Acid | <br>25 L/m²<br>100 kg/m²<br>4 L/m²<br>0.26 kg/m² | 403.26 | 403.76 | 56.18 | 44.0 | 31 | 13 | 9 | 10 | Moderate residue<br>Somewhat easy to wipe/clean |

Additional testing on cuttings treated 39 m³ of cuttings with 2 drums (208 L per drum) of emulsifier with 75 kg of waxy binding agent. In another test, 18 m³ of cuttings were processed with 1 drum of emulsifier and 200 kg of waxy binding agent. Further testing used 1 drum of emulsifier and 375 kg of waxy binding agent.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims. All patents and publications referred to herein are incorporated by reference.

What is claimed is:

1. A process for stabilizing drill cuttings comprising the steps of:
   a. providing a slurry comprising the drill cuttings to a tank having a mixing device;
   b. adding an emulsifier and waxy binding agent to the slurry in the tank;
   c. mixing the slurry with the mixing device;
   d. removing at least a portion of the slurry from the tank to a centrifuge;
   e. passing the at least a portion of the slurry through the centrifuge to separate a liquid and stabilized solid cuttings; and
   f. disposing of the stabilized solid cuttings.

2. The process of claim 1, further comprising the step of adding liquid to the slurry in the tank.

3. The process of claim 1, further comprising the step of returning at least a portion of the separated liquid from the centrifuge to the tank.

4. The process of claim 1, wherein the step of providing the slurry comprises separating the slurry comprising the drill cuttings from returned drilling fluid used for drilling a well, by passing the returned drilling fluid through a shaker to separate the slurry comprising the drill cuttings.

5. The process of claim 1, wherein the emulsifier is a nitrogen containing compound and/or wherein the waxy binding agent is a lipophilic agent.

6. The process of claim 5, wherein the emulsifier is an imidazoline.

7. The process of claim 1, wherein the emulsifier is a TOFA/DETA imidazoline.

8. The process of claim 1, wherein the waxy binding agent is one or more of stearamides, stearates, microcrystalline waxes, oil soluble resins, and lignites.

9. The process of claim 8, wherein the stearates are selected from metallic stearates.

10. The process of claim 9, wherein the metallic stearate is aluminum stearate, calcium stearate, or magnesium stearate.

11. The process of claim 1, wherein the emulsifier is added to the slurry in a concentration of 1% or less, by weight; and/or wherein the waxy binding agent is added to the slurry in a concentration of 1% or less, by weight.

12. The process of claim 1 wherein, prior to disposing of the stabilized solid cuttings, the stabilized solid cuttings are processed to remove oil and/or bitumen from the cuttings.

13. The process of claim 12 wherein the stabilized solid cuttings are processed in a solvent wash process to remove the oil and/or bitumen.

* * * * *